(12) United States Patent
Chapman

(10) Patent No.: US 7,475,117 B1
(45) Date of Patent: Jan. 6, 2009

(54) TWO-PHASE COMMIT ELECTRONIC MAIL DELIVERY

(75) Inventor: Alexander Chapman, Holly Springs, NC (US)

(73) Assignee: Teradata US, Inc., Miamisburg, OH (US)

( * ) Notice: Subject to any disclaimer, the term of this patent is extended or adjusted under 35 U.S.C. 154(b) by 0 days.

(21) Appl. No.: 11/304,172

(22) Filed: Dec. 15, 2005

(51) Int. Cl.
*G06F 15/16* (2006.01)

(52) U.S. Cl. .................. 709/206; 709/217; 709/230

(58) Field of Classification Search .................. 709/206
See application file for complete search history.

(56) References Cited

U.S. PATENT DOCUMENTS

| | | | |
|---|---|---|---|
| 6,035,327 A * | 3/2000 | Buckley et al. | 709/206 |
| 6,363,401 B2 * | 3/2002 | Yahya et al. | 707/202 |
| 6,775,711 B1 | 8/2004 | Akimoto | |
| 6,782,414 B1 | 8/2004 | Xue et al. | |
| 2002/0004820 A1 | 1/2002 | Baldwin et al. | |
| 2003/0200264 A1 | 10/2003 | Brill | |
| 2003/0229717 A1 * | 12/2003 | Teague | 709/246 |
| 2004/0153713 A1 | 8/2004 | Aboel-Nil | |
| 2004/0221011 A1 * | 11/2004 | Smith et al. | 709/206 |
| 2005/0193064 A1 | 9/2005 | Hales | |
| 2005/0223057 A1 | 10/2005 | Buchheit | |

OTHER PUBLICATIONS

Klensin J., RFC 2821 Simple Mail Transfer Protocol, Apr. 2001, IETF.*

* cited by examiner

*Primary Examiner*—Joseph E Avellino
*Assistant Examiner*—Michael E Keefer
(74) *Attorney, Agent, or Firm*—Schwegman, Lundberg & Woessner P.A.

(57) ABSTRACT

Techniques are presented for two-phase commit of electronic mail (email) processing. An email service interacts with a sender's service to prepare and commit emails. An email is not sent to a recipient until a commit is received from the sender's service. The sender's service records responses from the email service for tracking whether the emails are successfully sent or failed to be sent to their intended recipients.

20 Claims, 3 Drawing Sheets

United States Patent US 7,475,117 B1

TWO-PHASE COMMIT ELECTRONIC MAIL DELIVERY

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright© 2005, NCR Corp. All Rights Reserved.

FIELD

The invention relates generally to electronic mail (email) processing and more particularly to processing email using a two-phase commit process.

BACKGROUND

Electronic mail (email) is now one of the most preferred forms of communications. It seems individuals and enterprises are always available via email 24-7. Moreover, a wide swath of the population is now email literate and now has access to the Internet. That is, email is now widely popular with a variety of income groups, age groups, ethnicity groups, and the like. Consequently, email has become particularly attractive form of communication for enterprises. In fact, customers of enterprises may be more likely to accept email communication than to receive regular postal mail communication.

Generally, enterprises that use email in any significant way as a form of customer communication will employ some automated services to customize emails to particular customers or customer segments and to mass deliver those emails. This makes email communication even more attractive because very little human resources are required to process customer communications.

However, a few problems do exist with automated email services. For example, suppose an enterprise's email server fails while an email request was being sent to an external email server. In such a case, the enterprise may believe the email was never delivered, when in fact the email was delivered by the external email server to the intended recipient. In the same example, the enterprise may believe the email did get sent during the failure since it appears as being sent, when in fact the email may have never been delivered to the intended recipient.

Determining whether an email was sent or not sent can have significant implications on the enterprise. For instance, legal obligations may require that recipients receive certain legal disclaimers or documents from an enterprise and if the enterprise believes they were sent, when in fact they were not sent, then the enterprise may have to endure fines or produce good faith evidence that it believed the disclaimers or documents were sent to the recipients. In either case, the enterprise has to disrupt normal business processing to correct the problems; this consumes resources and may result in unexpected expenses by way of any fines levied.

In another example, the enterprise may annoy a customer if the customer receives multiple emails of the same subject matter or if the customer fails to receive an expected or beneficial email. This situation may be even more detrimental to the long term health of an enterprise than the potential legal implications because valued customers may be lost or may become disloyal to the enterprise.

As a result of these problems with traditional email processing, some more astute and concerned enterprise put a variety of manual checks in place to confirm emails were in fact sent and sent once. Unfortunately, this consumes human resources and is time consuming and not efficient for an enterprise that is relying on email technology to streamline its customer communications.

Thus, it can be seen that improved email processing techniques are desirable.

SUMMARY

In various embodiments, techniques for processing a two-phase electronic mail (email) commit are provided. In an embodiment, an Email message is sent to an email service. In addition a prepare option to prepare the email for processing is requested of the email service. Finally, a commit option is requested of the email service to process the email to its intended recipient if the prepare option is successfully acknowledged from the email service.

DETAILED DESCRIPTION

Figure 1:
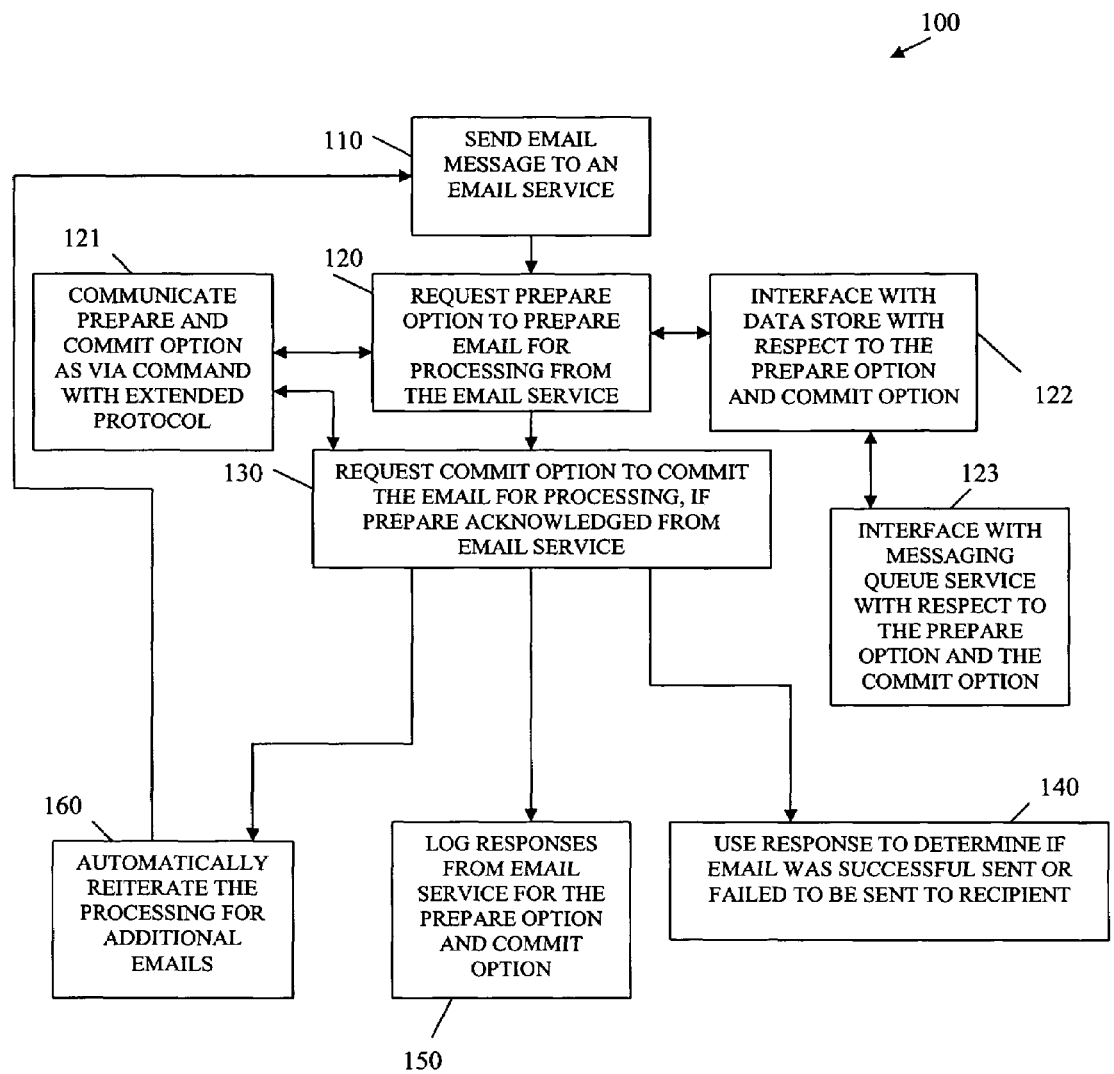
FIG. 1 is a diagram of a method for processing a two-phase commit with an electronic mail (email) service, according to an example embodiment.

FIG. 1 is a diagram of a method 100 for processing a two-phase commit with an electronic mail (email) service, according to an example embodiment. The method 100 (hereinafter "sender email service") is implemented in a machine-accessible or computer-readable medium and is accessible over a network. The network may be wired, wireless, or a combination of wired and wireless. The sender email service represents processing within an environment of a sender for an email, where the sender constructs the email and provides it to the sender email service. The sender email service provides the email to an external mail service (email server).

As used herein a "service" may be viewed as server, application, system, or automated resource. In an embodiment, a sender may use one or more applications to construct emails. The emails are processed on the sender side of a network by the sender's email service or email server. The sender's email service sends over the network the email to an external email service or external email server. The sender's email service and the external email service communicate using an email protocol, such as Simple Mail Transfer Protocol (SMTP) or Extended (ESMTP) for multimedia emails, and the like.

The sender email service process a modified email protocol in connection with its communications with the external mail service. As will be demonstrated herein, this modified email protocol permits the sender email service and the external email service to process in novel manners so as to permit the processing of an email to a recipient to be confirmed via a two-phase commit technique.

At 110, the sender email service sends an email to an external email service. Another application within the environment of the sender may have initially created the email and its addressee information. The sender email service handles emails for the sender and processes them to the external email service for subsequent delivery to the intended recipients. Again, communication between the sender email service and the external email service is via an email protocol.

The sender email service may send an extended protocol command to the external mail service to identify the fact that the sender email service wants to conduct an email transaction with the external mail service using a novel two-phase commit, discussed below. The command itself may include a variety of parameters or options. One option or parameter may identify that two-phase commit transaction is to take place. This option may be viewed as a begin two-phase commit transaction. In cases where SMTP is being used between the sender email service and the external email service, this may be identified as follows:

2PC <SP> BEGIN <CRLF>;
© NCR Corp, 2005 where 2PC identifies the extended email protocol command for a two-phase commit (2PC) transaction, <SP> is a ASCII space character code of 32, CR is a carriage return character (ASCII code 13), and LF is a line feed character (ASCII code 10).

The 2PC extended email protocol command may also include a variety of other options, such as, but not limited to a prepare option, a commit option, and an abort option. Each of these may appear within an extended SMTP as:

2PC <SP> PREPARE <CRLF>;
2PC <SP> COMMIT <CRLF>; and
2PC <SP> ABORT <CRLF>.
© NCR Corp, 2005

It is also to be understood that only the sender email service and the external email service have to support the extended protocol command and its available options. This is so, because the application constructing the email and transferring that email to the sender email service does not have to be extended, since the email is processed out of the sender's environment to the external email service by the sender's mail server or the sender email service, as being used herein.

Similarly, the recipient of the email does not have to support the extended protocol command at all either because the external email service only uses the extended protocol command to communicate with the sender and not the recipient. This means the extended protocol command may be more easily integrated into email communications at just the server level of the sender desiring to have such feature/function and the external email servers that process emails for such a sender to addressed recipients.

At 120, the sender email service request a prepare option to prepare an email for processing from the external email service to an intended recipient. It is noted that although the singular reference to a single recipient is being used herein, that any particular email may actually include a list of intended recipients or a distribution list reference that is associated with a plurality of recipients. Thus, a single email may emanate from a sender to one or many intended recipients.

The prepare option may be communicated (requested) to the external email service after a begin option within an extend SMTP as 2PC<SP>PREPARE<CRLF> statement. This instructs the external email service to respond with an acknowledgment only when the external email service is prepared to send the email to the intended recipient. Thus, at 121, and as previously described the sender email service may use an extended email protocol command with a prepare option or parameter to request or communicate the request for an email to be prepared before it is sent.

The preparation of the email at the external mail service's site is viewed as phase one of the two-phase commit technique described herein. The external email service only acknowledges this prepare option if it believes that it is presently capable of immediately delivering the email to the recipient. However, the email is not delivered unless and until the sender email service makes a commit option request of the external email service (phase two of the two-phase commit technique).

According to an embodiment, at 122, the sender email service may also engage a variety of other services or resources within its environment to participate in the two-phase commit technique. So, a data store may communicate directly with the sender email service and identify when it is prepared to log an email and commit to updating that log. That is, in high volume email environments a data store may be used to record email transactions, so an enterprise knows when it sent a recipient an email, what that email was, and the like. This information may be useful for satisfying any legal requirements about reporting certain disclaimers or documents as well, if the disclaimers or documents are being sent via email. It is also noted that the data store does not have to communicate or interact in any manner with the external email service; rather, the data store interacts with the sender email service. Moreover, a data store may be viewed as a database, a collection of databases organized as a data warehouse, a directory, electronic files, or various combinations of these.

In yet more embodiments, at 123, the sender email service may also involve another service, such as a messaging queue service with respect to the two-phase commit technique. A messaging queue service may be useful to house emails constructed en masse, such as via database queries, for subsequent processing an delivery on an individual basis to the sender email service.

In fact, many environments may deploy a messaging service that interfaces with its mail server before emails are delivered to external mail servers. Therefore, the messaging queue service may participate with the data store in connection with the sender email service to implement the two-phase commit technique described herein. Again, the messaging queue service does not have to interact with the external mail service in any manner; rather, it interacts with the sender email service.

It is noted that the sender email service may incorporate as many services as it deems necessary with the two-phase commit technique described herein. Thus, other services besides data store and messaging queue services may be configured to use the two-phase commit technique, if the operations of those other services are involved in email process or email tracking.

At 130, the sender email service requests from the external email service a commit option for the email. This is phase two of the two-phase commit technique. The commit option is not requested if the external email service did not successfully acknowledge phase one (the prepare option request). A prepare option may not be acknowledged for a variety of reasons.

For example, the sender email service may have also involved other services with the email processing, such as a data store and/or messaging queue services. These services may fail after the sender email service made the prepare request of the external email service; thus, the sender email service may want to abort the email transaction and may have sent an abort option to the external mail service before the external mail service had a chance to acknowledge the prepare option request.

The abort option may also be intentionally used by the sender email service after a successful prepare option request was acknowledged by the external email service when the sender email service determines that it does not want to proceed or that its other services are unable to proceed and thus it is in the sender email service's best interest to abort the email transaction.

In a more likely scenario, the external email service may detect a problem with the recipient's address or its network and cannot prepare the email for delivery. In still other situations, a failure may have occurred with communications between the sender email service and the external email service after the prepare option request is sent to the external email service but before the external email service is able to respond.

Thus, the sender email service sends the commit option request, if a valid phase one is acknowledged by the external mail service and if the sender email service determines it does not want to abort the transaction and wants to in fact proceed to the second phase.

At 140, the sender email service may use responses to each of the two phases, which are received from the external email service, to determine whether the email was successfully sent or whether it failed either intentionally (via an abort) or unintentionally.

At 150, and as was mentioned above, the sender email service may use responses from the external email service with respect to the two phases (prepare and commit) to log the responses or the results associated with the responses. For example, the sender email service may log to a data store that the email was sent successfully at a specific time to the intended recipient.

Again, this tracking or logging information may prove useful to an organizations email tracking and will also prove useful should some failure occur, since the log information will identify emails that were sent and ones that were not sent. This can help avoid making a mistake that the email was not sent and sending it a second time, which runs the risk of annoying the recipient, and this, can also help avoid assuming the email was sent when in fact it was never successfully processed by the external email service.

According to an embodiment, at 160, the entire processing cycle of the sender email service may be reiterated for additional emails associated with the sender or other senders that the sender email service processes emails for. Thus, each email emanating from the senders of the sender email service may be processed with a two-phase commit technique.

It is now appreciated how email delivery can include a two-phase commit processing cycle between email servers, one local to the sender and one external to the sender. The local server may also incorporate other email services within its environment to participate in the two-phase commit technique. This helps an enterprise assure that emails were processed or were not processed when failures occur.

Figure 2:
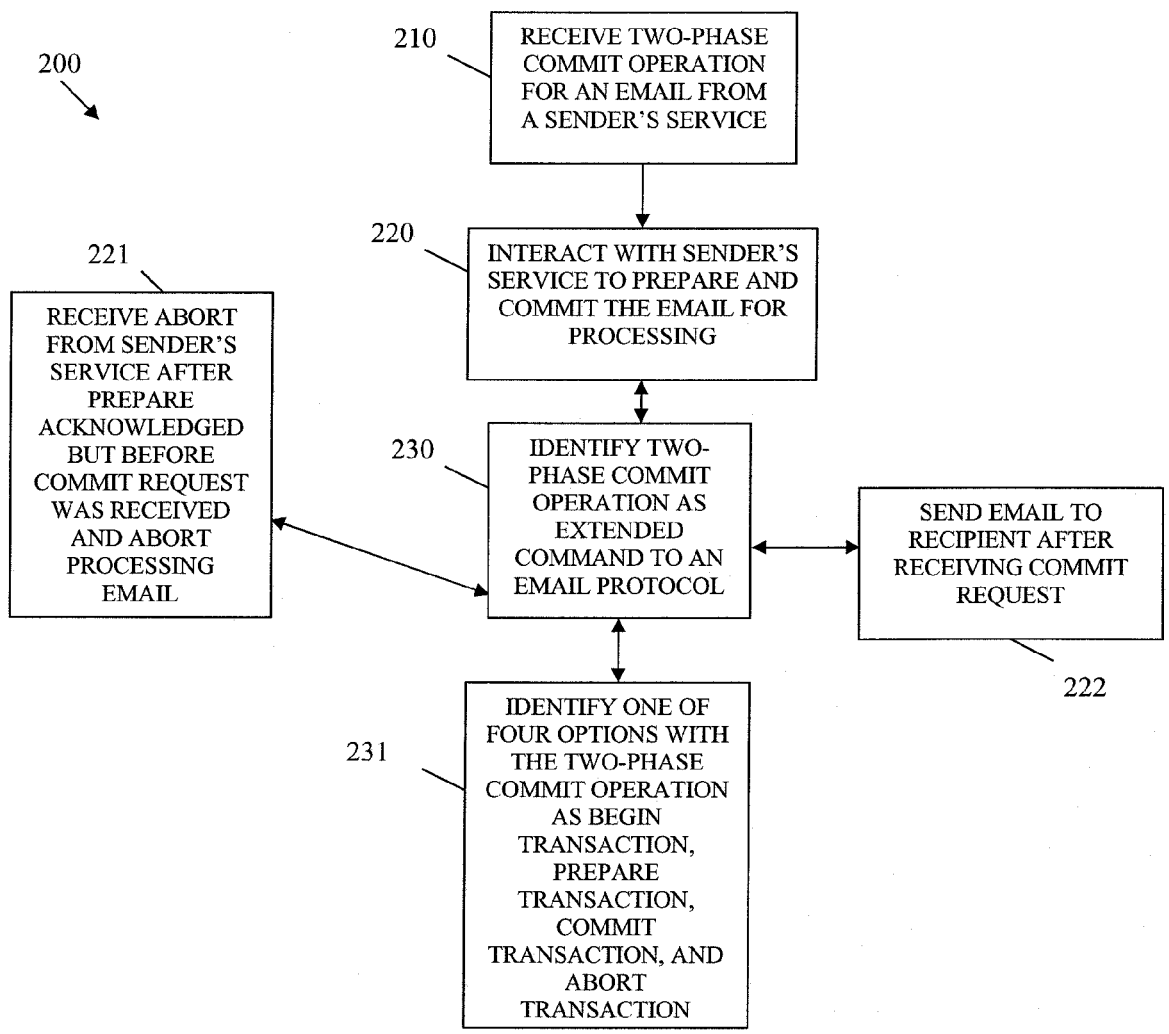
FIG. 2 is a diagram of a method for processing a two-phase commit with a sender's service that initially sends the email, according to an example embodiment.

FIG. 2 is a diagram of a method 200 for processing a two-phase commit with a sender's service that initially sends the email, according to an example embodiment. The method 200 (hereinafter "external email service") is implemented in a machine-accessible and readable medium and is accessible over a network. The network may be wired, wireless, or a combination of wired and wireless. In an embodiment, the external email service interacts with the sender's email service represented by the method 100 of the FIG. 1 to process a two-phase commit for processing emails of a sender to intended recipients.

While the sender email service represented by the method 100 of the FIG. 1 represents processing in an email two-phase commit technique, the external email service represents the modified processing on an external email service that may be used to achieve the teachings presented herein. Any existing or open source email service/server may be modified to perform the new and novel processing described herein to implement the two-phase commit technique. Additionally, custom email services/servers may be modified to achieve the novel processing described herein.

At 210, the external email service receives a two-phase commit operation for an email transaction from a sender email service. According to an embodiment, this operation is represented as 2PC and implemented within an extended version of SMTP. The two-phase commit operation precedes the email body and instructs the external email service to alter normal email processing to engage and participate in the two-phase commit operation, described herein.

At 220, the external email service interacts with the sender email service to prepare and perhaps commit the email for processing. During a prepare option for the two-phase commit operation, the external email service determines in response to a prepare request whether it is capable at that particular point in time of processing the email to the intended recipient. The email itself is not sent during this first phase for preparing the email.

According to an embodiment, at 221, and after the first phase, the external email service may receive from the sender email service an abort option. This abort option is also received before the external email service receives a commit option (phase two). In response to the abort option, the external email service aborts or ceases processing on the email. Such an operation may be beneficial to a sender email service when it determines that it does not want to proceed with the email or when it determines that all of its cooperating services are not prepared to log and assist processing the email from the sender's environment.

In another case, at 222, the external email service may receive the commit option from the sender email service. This indicates that the sender wants to commit to and to proceed with processing the email to the intended recipient. In response to receiving the commit option to the two-phase commit operation, the external email service sends or processes the email to the recipient.

It is also noted, that during the interaction, at 220, with the sender email service, the external email service at the conclusion of each phase sends an acknowledgment to the sender email service. In this manner, the sender email service can track the progress of the email and can be assured that the email was either sent to the recipient or not sent to the recipient. Moreover, if the external email service is unable to fulfill a particular phase, then the external email service may send a denial or a more intelligent error code, which the sender email service may use to perform exception processing, perform notifications, and the like.

At 230, and as has been described above, the external email service can identify the two-phase commit operation as an extended command to an existing email protocol, such as but not limited to, SMTP, ESMTP, etc. Furthermore, the two-phase commit operation may include four different options or parameters during its processing by the external email service. These four options may include, but are not limited to, a begin transaction, a prepare transaction (phase one), a commit transaction (phase two), and an abort transaction (used after phase one and before phase two).

It has now been described how a sender's email server may be modified to handle an extended email protocol command and how an external email server may be modified to handle the same command. The command processing between the two servers permit emails to undergo a two-phase commit cycle during their processing. This permits emails to be more properly tracked as to whether they were sent or not sent and permits emails to be recalled or aborted after the first phase but before the second phase. This new and novel two-phase commit technique permits enterprises to more efficiently and reliably use email communications with tracking and control mechanisms that conventionally are not available.

Figure 3:
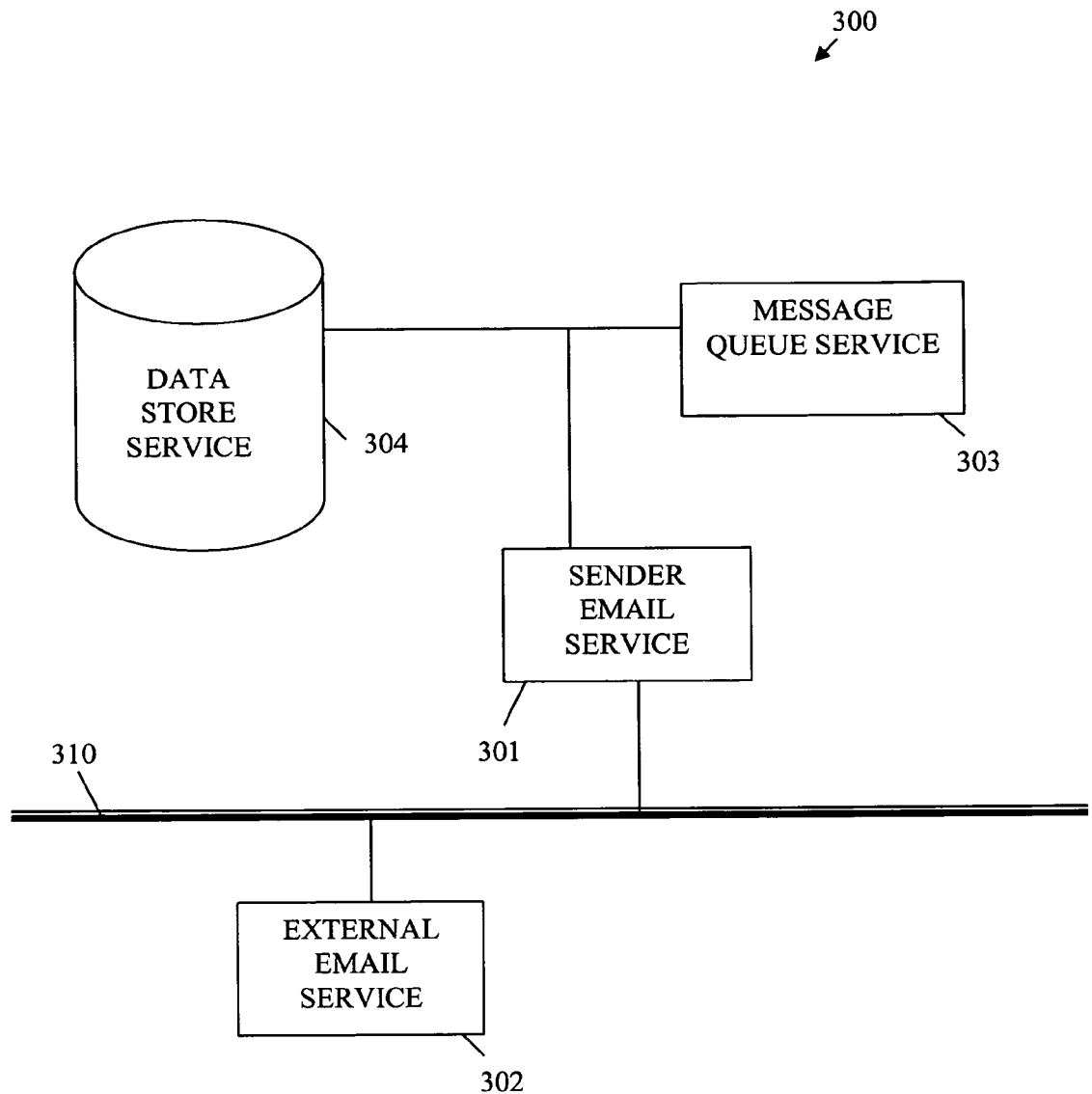
FIG. 3 is a diagram of a two-phase commit email system, according to an example embodiment.

FIG. 3 is a diagram of a two-phase commit email system 300, according to an example embodiment. The two-phase commit email system 300 is implemented in a machine-accessible and readable medium and is operational over a network. The network may be wired, wireless, or a combination of wired and wireless. In an embodiment, portions of the two-phase commit email system 300 implement processing of the sender email service and other portions represent processing of the external email service, represented by the methods 100 and 200 of the FIGS. 1 and 2, respectively.

The two-phase commit email system 300 includes a sender email service/server 301 and an external email service/server 302. The two-phase commit email system 300 may also include a message queue service 303 and/or a data store service 304. The sender email service 301 communicates over a network 310 with the external email service 302 using a modified email protocol that supports an extended protocol command that enables novel processing to achieve a two-phase commit technique for email processing.

The FIG. 3 is presented for purposes of illustration. Accordingly, other services may be added to the two-phase commit email system 300 and may participate in the two-phase commit processing. Additionally, although the data store service 304 and the message queue service 303 are depicted as being within the same local environment of network of the sender email service 301, such an arrangement does not have to always be the case, since the data store service 304 and the message queue service may exist over a Wide Area Network (WAN), such as the Internet, and communicate securely with the sender email service 301. Thus, the arrangement of the components for the two-phase commit email system 300 may also be altered without departing from the teachings presented herein.

The sender email service 301 processes emails from a sender's environment to the external email service 302 for potential subsequent delivery to intended recipients of those emails. In some cases, the sender email service 301 may interface or interact with a number of other services, such as the message queue service 303 and the data store service 304 before, during, and after the sender email service 301 interacts with the external email service 302 for a two-phase commit operation.

For example, the data store service 304 may be used by other applications known to the sender to construct one or more emails en masse. These emails may be placed in one or more queues associated with the message queue service 303 and then individually processed off the queue(s) by the sender email service 301 to the external email service 302 over the network 310. The data store service 304 may also record or track acknowledgements and interactions that occur between the sender email service 301 and the external email service 302 during a two-phase commit operation. The tracking information may be used to prove an email was in fact sent or to prove an email was not sent in the event of failures during various stages of email processing.

The sender email service 301 identifies a two-phase commit operation with an extended email protocol command, such as 2PC. The 2PC command may have at least four options or parameters while it processes, a begin option, a prepare option (phase one), a commit operation (phase two), and an abort operation (optional).

To initiate the two-phase commit operation with the external email service the sender email service 301 transmits a begin transaction to the external email service 302. This informs the external email service 302 that the sender email service 301 wants to bypass normal email processing and engage in an exception process to handle the email to be sent in a two-phase commit processing cycle.

Next, the sender email service 301 sends a prepare option to the external email service 302. This instructs the external email service 302 to verify the address of the recipient and put the email in a condition that at that point in time makes the external email service 302 believe that it can now successfully deliver the email to the intended recipient. But, the external email service 302 does not yet deliver the email to the recipient and will not until the sender email service 301 transmits a commit option.

It is noted that after each option associated with the two-phase commit operation is sent from the sender email service 301 to the external email service that the external email service 302 sends some kind of response, such as an acknowledgment, a denial, and/or an error code or error message.

After a prepare option is transmitted to the external email service 302, the sender email service 301 may elect for a variety of reasons to abort the email processing. If this is the case, the sender email service 301 sends an abort option or parameter to the external email service 302 and in response to that the external email service 302 deletes the email from its queues or holding areas and does not process the email to the intended recipient.

Assuming the external email service 302 responds favorably to a prepare request (phase one) and assuming that the sender email service 301 does not elect to abort processing an email to an intended recipient, the sender email service 301 sends a commit option or parameter (phase two) to the external email service 302. This instructs the external email service 302 to send the email to the intended recipient. If the external email service 302 responds with an acknowledgment, then the sender email service 301 is assured the email was sent to the recipient.

It is now appreciated how email processing may be altered by modifying a sender's email server/service 301 and an external email server/service 302 to process a two-phase commit operation for the email using a variety of options or parameters with that operation. The transaction history of the command may be recorded by the sender email service 301, perhaps in a data store 304, and used to prove an email was processed or was not processed as it was expected. Additionally, the sender email service 301 has the ability to abort email transactions at some points in time (after phase one but before phase two) and may engage other services that handle the email in the two-phase commit processing, such as, but not limited to a message queue service 303 and a data store service 304.

Further although various benefits may be realized with the teachings presented herein, there is one area that may prove particularly beneficial to enterprises engaged in active Customer Relationship Management (CRM). For example, an enterprise may want to build a holistic view of all "contacts" (communications) that the enterprise has had with customers.

These contacts may include, by way of example only, email, phone conversations, conversations in person at locations of the enterprise, visits to hotels, transactions at a bank, transactions at retail establishments, direct postal mail, etc. Having developed this view of all customer contacts, enterprise may develop rules designed to avoid over communicating with customers, something which has been shown to have a potential detrimental effect on the relationship between the customers and the enterprises. The teachings presented herein and the tracking of email communications may be integrated into any holistic or 360 degree view of communications with customers.

It should also be understood that the teachings presented herein assure that an email was either received and processed by an external email server or not received and processed by that email server. The processing of the email further downstream is not monitored. That is, there may be other email servers beyond the initial external email server and the recipient may have its own email server. However, if the further downstream servers and the recipients' email servers were to also implement the processing for the extended email protocol to implement a two-phase commit operation, then these downstream processes could also receive the same tracking and assurances presented herein.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a machine-accessible medium, comprising:
   sending, from a sender electronic mail (email) service using an extended email protocol, an email message constructed by a user within the user's environment to a recipient email service over a network;
   requesting, via the sender email service using the extended email protocol, of the recipient email service a prepare option, which is identified as a two-phase commit operation in the extended email protocol, the prepare operation to prepare the email for processing but having the recipient email service hold the email message and not deliver it to a recipient until a commit operation is received and at this time the recipient email service has the email message within a recipient's environment of the recipient, and wherein the recipient email service also uses the extended email protocol during interactions with the sender email service, and wherein the prepare option represents a first phase of a two-phase email commit process supported in the extended email protocol; and
   requesting of the recipient email service, via the sender email service, a commit option to deliver the email to the recipient within the environment, when the prepare option is successfully acknowledged from the recipient email service and when an abort is not desired, and wherein the email is sent from the recipient email service to the recipient in the recipient's environment over the network when the recipient email service receives the commit operation, and wherein the recipient email service just sends an acknowledgement for the prepare operation when the recipient email service can fulfill the commit operation and even before the commit operation is requested of the recipient email service and the recipient email service has the email message after receipt of the prepare operation but again does not deliver it to the recipient until the commit operation is received, and wherein the commit option represents a second phase of the two-phase email commit process supported in the extended email protocol that both the sender email service and the recipient email service use and support, wherein the extended email protocol is an extended version of Simple Mail Transfer Protocol (SMTP), and wherein the prepare and commit operations are added to SMTP to create the extended SMTP protocol.

2. The method of claim 1, wherein the step of requesting the prepare option further includes interfacing with a data store that tracks the email and information about the email in the data store and having the data store prepare and commit with the recipient email service.

3. The method of claim 2, wherein the step of requesting the prepare option further includes interfacing with an email messaging queue service that submits the email off a queue for processing to the recipient email service and having the email messaging queue service prepare and commit along with the data store and the recipient email service.

4. The method of claim 1 further comprising, the step of requesting the prepare option and the commit option is achieved via the extended email protocol supported by both the sender email service and the recipient email service and the extended email protocol is an extended version of the SMTP that supports interaction via a command, wherein the prepare option is one parameter value associated with the command and the commit option is another parameter value associated with the command.

5. The method of claim 1 further comprising, the step of automatically reiterating the method for additional emails.

6. The method of claim 1 further comprising, the step of using responses from the recipient email service to at least one of:
   determining if the email is successfully sent to the recipient; and
   determining if the email fails to be sent to the recipient.

7. The method of claim 1 further comprising, the step of logging responses from the recipient email service for the prepare option and the commit option.

8. A method implemented in a machine-accessible medium, comprising:
   receiving, at a recipient email service, a two-phase commit operation, initially identified as a two-phase prepare operation, the two-phase commit operation for an electronic mail (email) from a sender email service of a sender, wherein the email is constructed by a user within an environment of the sender email service and sent from the sender email service over a network, and wherein the two-phase commit operation is supported within an extended email protocol that both the recipient email service and the sender email service support; and interacting with the sender email service, via the recipient email service, to prepare and commit the email for processing to a recipient, and wherein the email is sent to the recipient over the network and within an environment of the recipient in response to a successful preparation and commit, and wherein an acknowledgement is sent to the sender email service after the preparation or first phase when a second phase associated with the commit is assured to be capable of proceeding, and wherein the email is received with the prepare operation and held and not delivered to the recipient until the commit operation is received from the sender email service and the email is held within the environment of the recipient and not yet delievered within the environment of the recipient until the commit operation is received from the sender email service, wherein the extended email protocol is an extended version of Simple Mail Transfer Protocol (SMTP), and wherein the prepare and commit operations are added to SMTP to create the extended SMTP protocol.

9. The method of claim 8 further comprising, identifying the two-phase commit operation as an extended command associated with an extended version of the SMTP that both the sender email service and the recipient email service support.

10. The method of claim 9 further comprising, the step of identifying one of four options with the two-phase commit operation, wherein the four options include begin transaction, prepare transaction, commit transaction, and abort transaction.

11. The method of claim 8, wherein the step of interacting further includes sending acknowledgements for each interaction back to the sender email service, via the recipient email service, for tracking and logging by the sender email service or another service interfaced to the sender email service.

12. The method of claim 8 further comprising, the step of receiving an abort from the sender email service after the prepare request had been acknowledged but before the commit request was received, and in response to the abort terminating the processing of the email to the recipient.

13. The method of claim 8 further comprising, the step of sending the email to the recipient after receiving the commit from the sender email service.

14. A system comprising:
a sender electronic mail (email) service of a sender; and
an external recipient email service, wherein the sender email service is to interactively communicate with the external recipient email service to enforce a two-phase acknowledged commit before an email from the sender is delievered to a recipient via the external recipient email service that resides within an environment of the recipient, and wherein a first phase entails the sender email service requesting a preparation and acknowledged receipt of the email via a two-phase prepare operation and a second phase entails the sender email service requesting a commit of the external recipient email service to send the email to the recipient via a two-phase commit operation, and wherein the external recipient email service sends an acknowledgement after the first phase and before the second phase and just when the external recipient email service can satisfy the commit, and wherein the external recipient email service receives the email with the first phase but holds delivery of the email within the environment of the recipient unit the second phase is requested from the sender email service, and wherein the two-phase acknowledge commit is implemented in an extended email protocol that both the sender email service and the external recipient email service support, wherein the extended email protocol is an extended version of Simple Mail Transfer Protocol (SMTP), and wherein the prepare and commit operations are added to SMTP to create the extended SMTP protocol.

15. The system of claim 14 further comprising, the step of a data store service that participates with the sender email service in the two-phase acknowledgement, wherein the data store service tracks the email and information about the email.

16. The system of claim 15 further comprising, a message queue service that participates with the sender email service and the data store service in the two-phase acknowledgement, wherein the message queue service initially queues the email with a plurality of other emails for processing to the sender email service.

17. The system of claim 14, wherein the external recipient email service is to identify the two-phase acknowledgment via an initial begin option that is associated with the extended email protocol.

18. The system of claim 17, wherein the two-phase acknowledgment includes the external recipient email service acknowledging a prepare option to prepare the email for sending and acknowledging a commit option to confirm the email has been sent to the recipient.

19. The method of claim 14, wherein the two-phase acknowledgment is implemented as a command within the extended email protocol, and wherein the command has four options.

20. The method of claim 19, wherein the options include, begin transaction, prepare transaction, commit transaction, and abort transaction.

* * * * *